(12) United States Patent
Lin (10) Patent No.: US 10,070,331 B2
(45) Date of Patent: *Sep. 4, 2018

(54) METHODS AND SYSTEMS FOR MANAGING BANDWIDTH FOR USER DEVICES ON A TRANSPORTATION VEHICLE

(71) Applicant: Panasonic Avionics Corporation, Lake Forest, CA (US)

(72) Inventor: Changhwa Lin, Irvine, CA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/913,600

(22) Filed: Mar. 6, 2018

(65) Prior Publication Data

US 2018/0199221 A1 Jul. 12, 2018

Related U.S. Application Data

(63) Continuation of application No. 15/004,235, filed on Jan. 22, 2016, now Pat. No. 9,949,155.

(51) Int. Cl.
*H04W 24/08* (2009.01)
*H04L 29/08* (2006.01)

(52) U.S. Cl.
CPC ............ *H04W 24/08* (2013.01); *H04L 67/12* (2013.01)

(58) Field of Classification Search
CPC ... H04W 4/00; H04W 76/021–76/027; H04W 84/005

See application file for complete search history.

(56) References Cited

U.S. PATENT DOCUMENTS

| 7,343,157 B1 | 3/2008 | Mitchell |
| 8,125,946 B2 | 2/2012 | Csapo |
| 8,457,627 B2 | 6/2013 | Lauer |
| 8,755,342 B2 | 6/2014 | Iyer et al. |

(Continued)

FOREIGN PATENT DOCUMENTS

DE    102014200226    7/2015

OTHER PUBLICATIONS

Extended European Search Report from EPO dated Mar. 8, 2017 for EP Application No. 17150575.3.

(Continued)

*Primary Examiner* — Asad Nawaz
*Assistant Examiner* — Syed S Ali
(74) *Attorney, Agent, or Firm* — Klein, O'Neill & Singh, LLP (57) ABSTRACT

Methods and systems for a transportation vehicle are provided. One method includes collecting by a processor connection information for a plurality of user devices accessing a wireless network on a transportation vehicle; determining by the processor available bandwidth for the plurality of user devices depending on a connection type; monitoring currently used bandwidth by the plurality of user devices; receiving a request from a user device to access content via the wireless connection; determining by the processor additional bandwidth for accessing the content by the user device; and rejecting the request for accessing the content when the additional bandwidth and the currently used bandwidth equals or exceeds the available bandwidth for the plurality of user devices.

14 Claims, 7 Drawing Sheets

(56) References Cited

U.S. PATENT DOCUMENTS

| | | | |
|---|---|---|---|
| 8,775,631 | B2 | 7/2014 | Luna |
| 9,317,983 | B2 * | 4/2016 | Ricci ................. H04W 4/21 |
| 9,674,880 | B1 * | 6/2017 | Egner ................ H04W 4/029 |
| 9,979,554 | B2 * | 5/2018 | Watson .............. H04L 9/3271 |
| 2002/0057678 | A1 * | 5/2002 | Jiang ................ H04L 12/66 |
| | | | 370/353 |
| 2004/0240390 | A1 | 12/2004 | Seckin |
| 2005/0216938 | A1 | 9/2005 | Brady, Jr. et al. |
| 2009/0100476 | A1 | 4/2009 | Frisco et al. |
| 2009/0320077 | A1 | 12/2009 | Gazdzinski |
| 2011/0093605 | A1 | 4/2011 | Choudhury et al. |
| 2011/0314489 | A1 | 12/2011 | Keen et al. |
| 2012/0209505 | A1 | 8/2012 | Breed et al. |
| 2013/0103779 | A1 | 4/2013 | Bai et al. |
| 2013/0293394 | A1 | 11/2013 | Rubin et al. |
| 2013/0332025 | A1 * | 12/2013 | Ziarno ............ G05B 23/0213 |
| | | | 701/33.4 |
| 2014/0115128 | A1 | 4/2014 | Myrberg et al. |
| 2014/0269314 | A1 | 9/2014 | Ozer et al. |
| 2014/0303807 | A1 | 10/2014 | Addepalli et al. |
| 2014/0306814 | A1 * | 10/2014 | Ricci ................. H04W 4/21 |
| | | | 340/425.5 |
| 2015/0029987 | A1 | 1/2015 | Addepalli et al. |
| 2015/0197248 | A1 | 7/2015 | Breed et al. |
| 2015/0242772 | A1 | 8/2015 | Backof, II et al. |
| 2015/0330869 | A1 * | 11/2015 | Ziarno .............. G01M 15/14 |
| | | | 701/34.4 |
| 2016/0203652 | A1 | 7/2016 | Throop et al. |
| 2016/0258757 | A1 | 9/2016 | Heckman et al. |
| 2016/0352533 | A1 | 12/2016 | Talty et al. |

OTHER PUBLICATIONS

Office Action from USPTO dated Jun. 14, 2017 for U.S. Appl. No. 15/004,235.
Communication from EPO dated Jul. 31, 2017 for EP Application No. 17150575.3.
Final Office Action from USPTO dated Oct. 11, 2017 for U.S. Appl. No. 15/004,235.
Notice of Allowance from USPTO dated Jan. 5, 2018 for U.S. Appl. No. 15/004,235.

* cited by examiner

METHODS AND SYSTEMS FOR MANAGING BANDWIDTH FOR USER DEVICES ON A TRANSPORTATION VEHICLE

CROSS-REFERENCE TO RELATED APPLICATION

This application is a continuation of patent application Ser. No. 15/004,235, entitled "METHODS AND SYSTEMS FOR MANAGING BANDWIDTH FOR USER DEVICES ON A TRANSPORTATION VEHICLE", filed on Jan. 22, 2016, the disclosure of which is incorporated herein by reference in its entirety.

BACKGROUND

Technical Field

The present disclosure relates to managing available bandwidth for user devices at a transportation vehicle.

Background

Transportation vehicles, for example, aircraft, trains, buses, recreation vehicle, boats and other similar vehicles use various computing devices for providing various functions, including entertainment content, control systems and others. These devices include hardware (for example, servers, switches, network interface cards, storage adapters, storage devices and others) and software (for example, server applications, operating systems, firmware, management applications, application programming interface (APIs) and others).

User computing devices (for example, mobile devices, laptops, tablets and other devices) commonly attempt to access audio, video and other content type in transportation vehicles. A wireless connection (Wi-Fi) connection maybe used to access such content. Conventional systems do not efficiently manage bandwidth allocation on transportation vehicles. For example, when a connected user wants to access a video file, if the bandwidth for the video file exceeds available bandwidth, then a conventional system simply slows down the download of the video file. Continuous efforts are being made to better manage available bandwidth on a transportation vehicle and/or other locations.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

As a preliminary note, the terms "component", "module", "system", and the like as used herein are intended to refer to a computer-related entity, either software-executing general purpose processor, hardware, firmware and a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), solid state memory device or any other storage device, in accordance with the claimed subject matter.

In one aspect, various methods and systems for a transportation vehicle are provided. As an example, one method includes collecting by a processor connection information for a plurality of user devices accessing a wireless network at a transportation vehicle; determining by the processor available bandwidth for the plurality of user devices depending on a connection type; monitoring currently used bandwidth by the plurality of user devices; receiving a request from a user device to access content via the wireless connection; determining by the processor additional bandwidth for accessing the content by the user device; and rejecting the request for accessing the content when the additional bandwidth and the currently used bandwidth equals or exceeds the available bandwidth for the plurality of user devices.

Figure 1A:
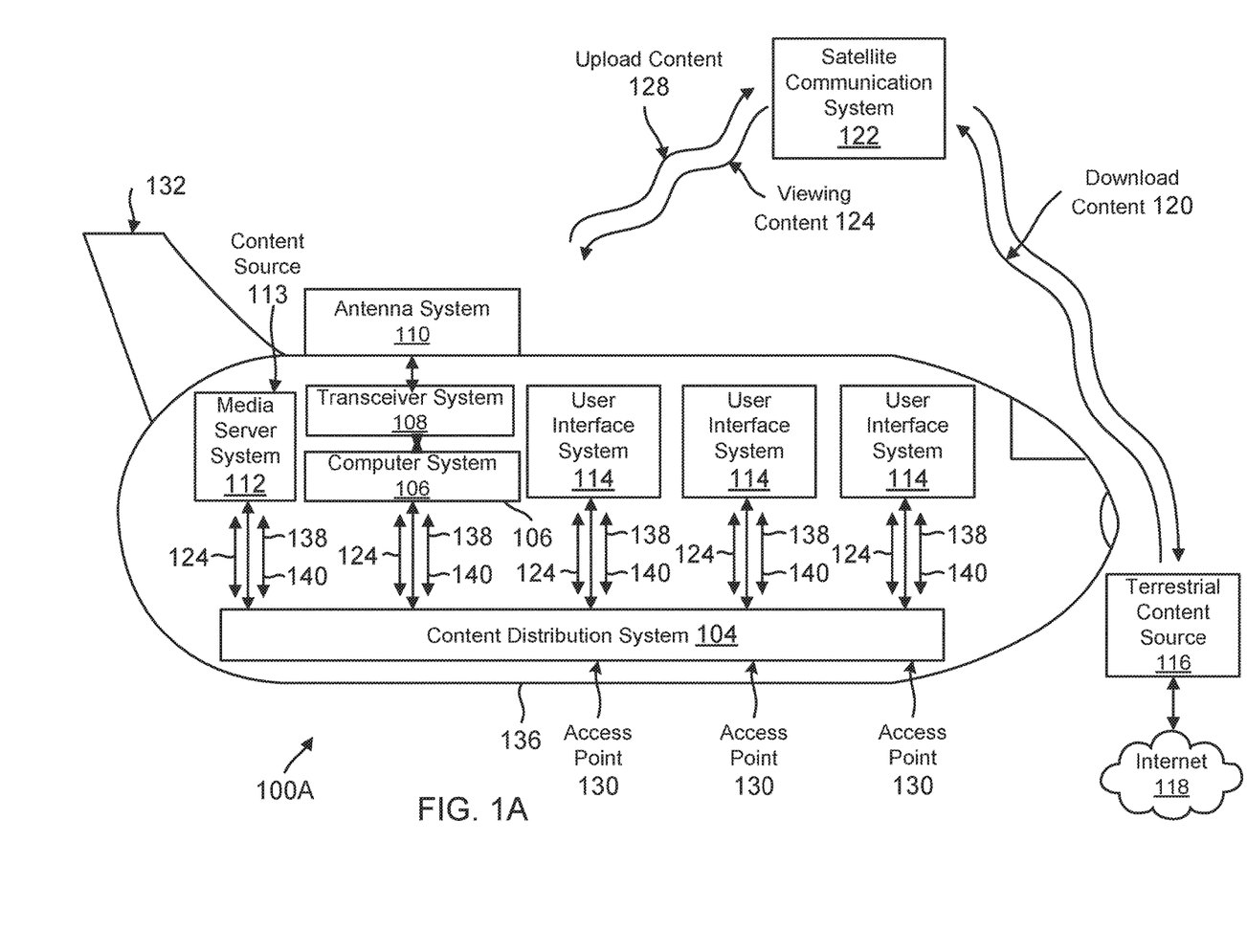
FIG. 1A shows an example of an operating environment for implementing the various aspects of the present disclosure in an aircraft.

Vehicle Information System:

FIG. 1A shows an example of a vehicle information system 100A (also referred to as system 100A) that can be configured for installation aboard an aircraft 132, according to one aspect of the present disclosure. When installed on an aircraft, system 100A can comprise a conventional aircraft passenger in-flight entertainment (IFE) system, such as the Series 2000, 3000, eFX, eX2, eXW, and/or other in-flight entertainment system as manufactured and provided by Panasonic Avionics Corporation (without derogation of any trademark rights of Panasonic Avionics Corporation) of Lake Forest, Calif.

System 100A comprises at least one conventional content source 113 and one or more user (or passenger) interface systems 114 that communicate with a real-time content distribution system 104. The content sources 113 may include one or more internal content sources, such as a media server system 112, that are installed aboard the aircraft 132, one or more remote (or terrestrial) content source 116 that can be external from the aircraft 132, or a distributed content system. The media server system 112 can be provided as an information system controller for providing overall system control functions for system 100A and/or for storing viewing content 124, including pre-programmed viewing content and/or downloaded viewing content 120, as desired. Exemplary viewing content 124 can include television programming content, music content, podcast content, photograph album content, audiobook content, and/or movie content without limitation. The exemplary viewing content as shown and described herein are not exhaustive and are provided herein for purposes of illustration only and not for purposes of limitation.

The server system 112 can include, and/or communicate with, one or more conventional peripheral media storage systems (not shown), including optical media devices, such as a digital video disk (DVD) system or a compact disk (CD) system, and/or magnetic media systems, such as a video cassette recorder (VCR) system, a solid state drive (SSD) system, or a hard disk drive (HDD) system, of any suitable kind, for storing the preprogrammed content and/or the downloaded viewing content 120.

The viewing content 124 can comprise any conventional type of audio and/or video viewing content, such as stored (or time-delayed) viewing content and/or live (or real-time) viewing content. As desired, the viewing content 124 can include geographical information. Alternatively, and/or additionally, to entertainment content, such as live satellite television programming and/or live satellite radio programming, the viewing content likewise can include two-way communications, such as real-time access to the Internet 118 and/or telecommunications.

Being configured to distribute and/or present the viewing content 124 provided by one or more selected content sources 113, system 100A can communicate with the content sources 113 in real time and in any conventional manner, including via wired and/or wireless communications. System 100A and the terrestrial content source 116, for example, can communicate directly and/or indirectly via an intermediate communication system, such as a satellite communication system 122. System 100A thereby can receive (download) viewing content 120 from a selected terrestrial content source 116 and/or transmit (upload) viewing content 128, including navigation and other control instructions, to the terrestrial content source 116. As desired, the terrestrial content source 116 can be configured to communicate with other terrestrial content sources (not shown). The terrestrial content source 116 is shown as providing access to the Internet 118. Although shown and described as comprising the satellite communication system 122 for purposes of illustration, the communication system can comprise any conventional type of wireless communication system, such as a cellular communication system (not shown) and/or an Aircraft Ground Information System (AGIS) communication system (not shown).

To facilitate communications with the terrestrial content sources 116, system 100A may also include an antenna system 110 and a transceiver system 106 for receiving the viewing content from the remote (or terrestrial) content sources 116. The antenna system 110 preferably is disposed outside, such as an exterior surface of a fuselage 136 of the aircraft 132. The antenna system 110 can receive viewing content 124 from the terrestrial content source 116 and provide the received viewing content 124, as processed by the transceiver system 108, to a computer system 106 of system 100A. The computer system 106 can provide the received viewing content 124 to the media (or content) server system 112 and/or directly to one or more of the user interfaces 114, as desired. Although shown and described as being separate systems for purposes of illustration, the computer system 106 and the media server system 112 can be at least partially integrated.

The user interface system 114 may be computing terminals in communication with an access point 130. The user interface system 114 provides a display device to view content. The user interface system 114 includes a hardware interface to connect to an access point 130 that provides a wired and/or a wireless connection for the user interface system. In at least one embodiment, the user interface system 114 comprises a software application that a user downloads and installs on a personal user device carried aboard by a user (a personal electronic device or "PED") to receive and view content via an access point 130. While bandwidth limitation issues may occur in a wired system on a vehicle, such as an aircraft 132, in general the wired portion of the vehicle information 100a system is designed with sufficient bandwidth to support all users aboard the vehicle, i.e., passengers.

The user interface system 114 can include an input system (not shown) for permitting the user (or passenger) to communicate with system 100A, such as via an exchange of control signals 138. For example, the input system can permit the user to enter one or more user instructions 140 for controlling the operation of system 100A. Illustrative user instructions 140 can include instructions for initiating communication with the content source 113, instructions for selecting viewing content 124 for presentation, and/or instructions for controlling the presentation of the selected viewing content 124. If a fee is required for accessing the viewing content 124, payment information likewise can be entered via the input system. The input system can be provided in any conventional manner and typically includes one or more switches (or pushbuttons), such as a keyboard or a keypad, and/or a pointing device, such as a mouse, trackball, or stylus.

In one aspect, the user interface system 114 is provided at individual passenger seats of aircraft 132. The user interface system 114 can be adapted to different aircrafts and seating arrangements. Details of the user interface system 114 are not germane and hence have not been provided herein.

Figure 1B:
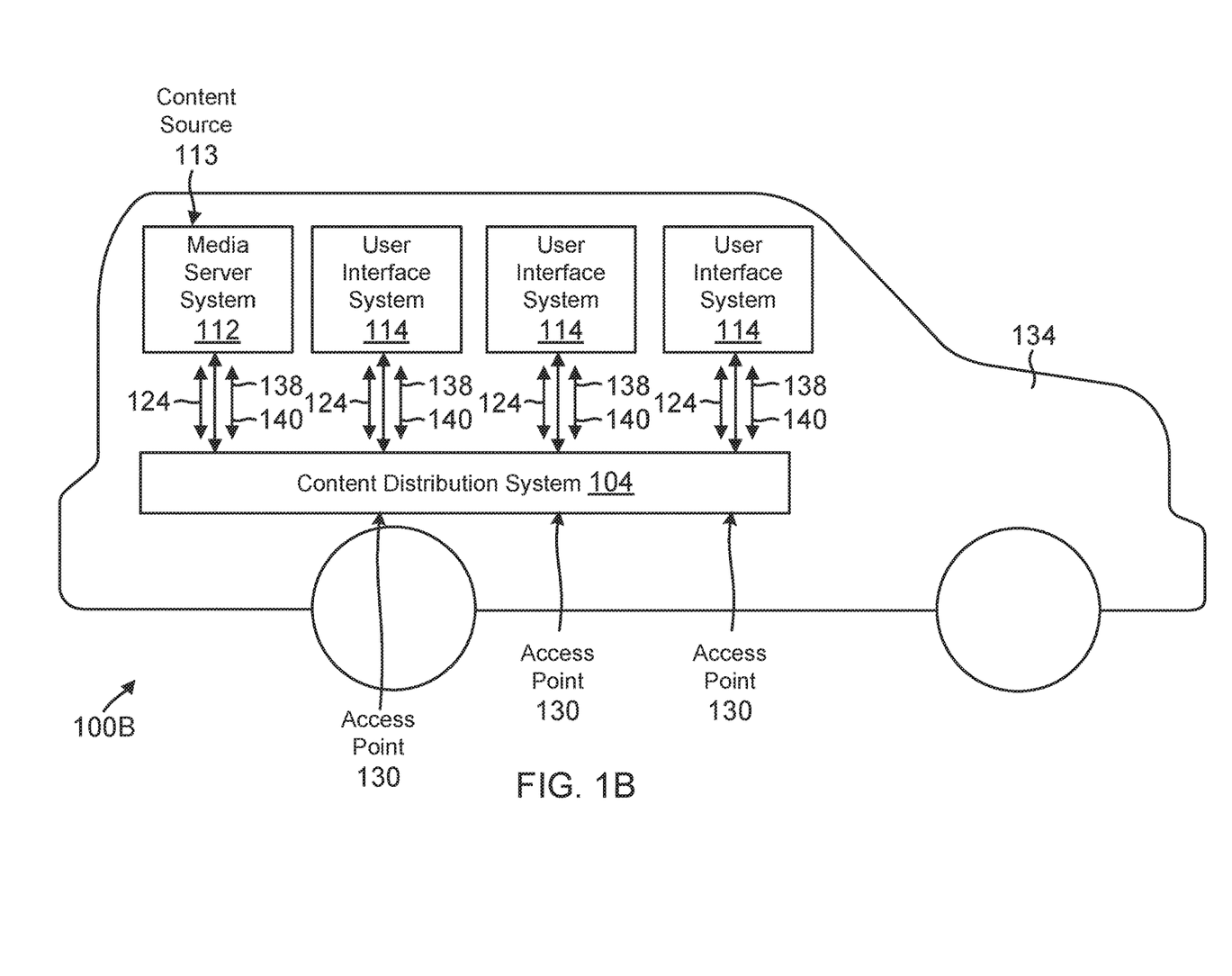
FIG. 1B shows an example of the operating environment at another vehicle, according to one aspect of the present disclosure.

FIG. 1B shows an example of implementing the vehicle information system 100B (may be referred to as system 100B) on an automobile 134 that may include a bus, a recreational vehicle, a boat, and/or a train, or any other type of passenger vehicle without limitation. The various components of system 100B may be similar to the components of system 100A described above with respect to FIG. 1A and for brevity are not described again.

Figure 2:
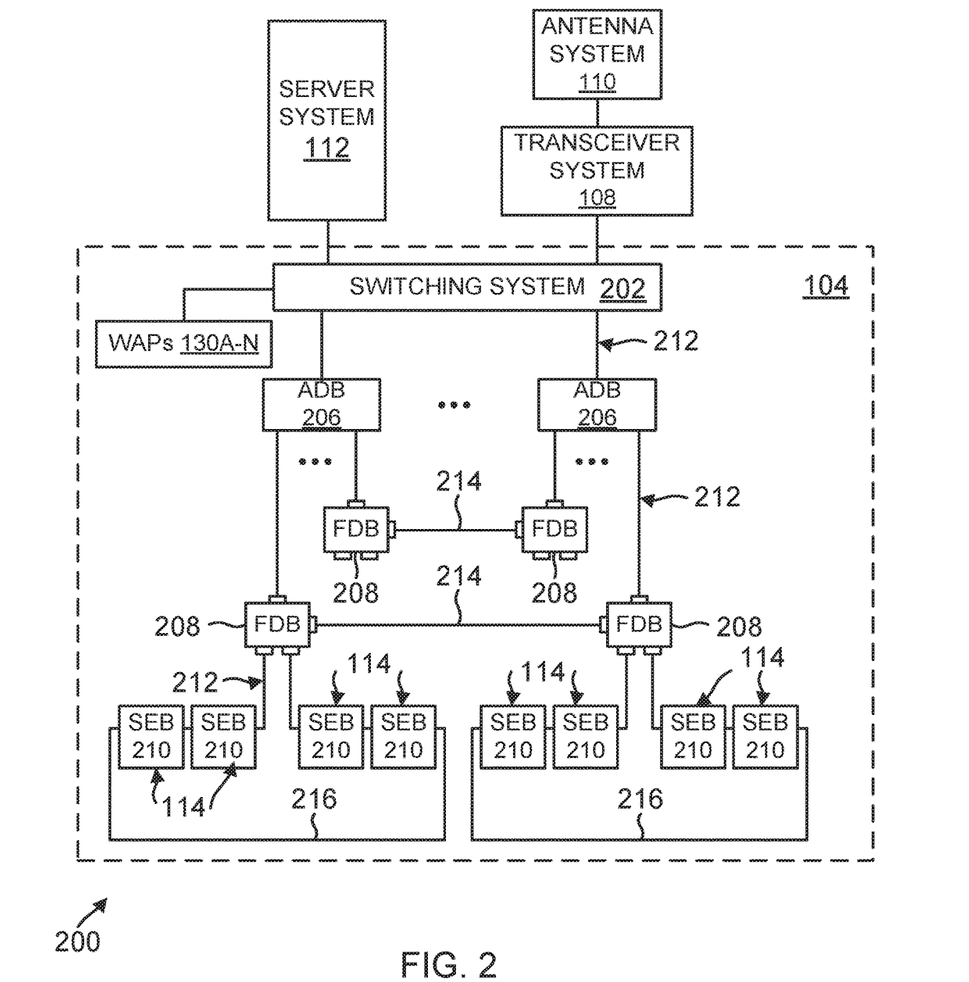
FIG. 2 shows an example of a content distribution system, used according to one aspect of the present disclosure.

Content Distribution System:

FIG. 2 illustrates an example of the content distribution system 104 for the vehicle information system 200 (similar to 100A/100B), according to one aspect of the present disclosure. The content distribution system 104 couples, and supports communication between the server system 112, and the plurality of user interface systems 114.

The content distribution system 104, for example, can be provided as a conventional wired and/or wireless communication network, including a telephone network, a local area network (LAN), a wide area network (WAN), a campus area network (CAN), personal area network (PAN) and/or a wireless local area network (WLAN), of any kind Exemplary wireless local area networks include wireless fidelity (Wi-Fi) networks in accordance with Institute of Electrical and Electronics Engineers (IEEE) Standard 802.11 and/or wireless metropolitan-area networks (MANs), which also are known as WiMax Wireless Broadband, in accordance with IEEE Standard 802.16. Preferably being configured to support high data transfer rates, the content distribution system 104 may comprise a high-speed Ethernet network, such as any type of Fast Ethernet (such as 100 Base-X and/or 100 Base-T) communication network and/or Gigabit (such as 1000 Base-X and/or 1000 Base-T) Ethernet communication network, with a typical data transfer rate of at least approximately one hundred megabits per second (100 Mbps) or any other transfer rate. To achieve high data transfer rates in a wireless communications environment, free-space optics (or laser) technology, millimeter wave (or microwave) technology, and/or Ultra-Wideband (UWB) technology can be utilized to support communications among the various system resources, as desired.

As illustrated in FIG. 2, the distribution system 104 can be provided as a plurality of area distribution boxes (ADBs) 206, a plurality of floor disconnect boxes (FDBs) 208, and a plurality of seat electronics boxes (SEBs) (and/or video seat electronics boxes (VSEBs) and/or premium seat electronics boxes (PSEBs)) 210 being configured to communicate in real time via a plurality of wired and/or wireless communication connections 212. The distribution system 104 likewise can include a switching system 202 for providing an interface between the distribution system 104 and the server system 112. The switching system 202 can comprise a conventional switching system, such as an Ethernet switching system, and is configured to couple the server system 112 with the area distribution boxes 206. Each of the area distribution boxes 206 is coupled with, and communicates with, the switching system 202. In addition, the distribution system 104 includes one or more wireless access points (WAPs) 130A to 130N) connected in communication with the switch system 202 for wireless distribution of content as explained more fully below.

Each of the area distribution boxes 202, in turn, is coupled with, and communicates with, at least one floor disconnect box 208. Although the area distribution boxes 206 and the associated floor disconnect boxes 208 can be coupled in any conventional configuration, the associated floor disconnect boxes 208 preferably are disposed in a star network topology about a central area distribution box 206 as illustrated in FIG. 2. Each floor disconnect box 208 is coupled with, and services, a plurality of daisy-chains of seat electronics boxes 210. The seat electronics boxes 210, in turn, are configured to communicate with the user interface systems 114. Each seat electronics box 210 can support one or more of the user interface systems 114.

The switching systems 202, the area distribution boxes 206, the floor disconnect boxes 208, the seat electronics boxes (and/or video seat electronics boxes (VSEBs) and/or premium seat electronics boxes (PSEBs)) 210, the antenna system 110, the transceiver system 108, the content source 113, the server system 112, and other system resources of the vehicle information system preferably are provided as line replaceable units (LRUs). The use of LRUs facilitate maintenance of the vehicle information system 200 because a defective LRU can simply be removed from the vehicle information system 200 and replaced with a new (or different) LRU. The defective LRU thereafter can be repaired for subsequent installation. Advantageously, the use of LRUs can promote flexibility in configuring the content distribution system 104 by permitting ready modification of the number, arrangement, and/or configuration of the system resources of the content distribution system 104. The content distribution system 104 likewise can be readily upgraded by replacing any obsolete LRUs with new LRUs.

The distribution system 104 can include at least one FDB internal port bypass connection 214 and/or at least one SEB loopback connection 216. Each FDB internal port bypass connection 214 is a communication connection 212 that permits floor disconnect boxes 208 associated with different area distribution boxes 206 to directly communicate. Each SEB loopback connection 216 is a communication connection 212 that directly couples the last seat electronics box 210 in each daisy-chain of seat electronics boxes 210 for a selected floor disconnect box 208 as shown in FIG. 2. Each SEB loopback connection 216 therefore forms a loopback path among the daisy-chained seat electronics boxes 210 coupled with the relevant floor disconnect box 208.

In an alternate embodiment, the satellite communication system 122 and associated components, e.g., antenna and transceiver systems 110 and 108 of FIG. 1A, are omitted with the content distribution system 104 retained and relying on content pre-stored on the vehicle 132. For variety, new content is periodically supplied, e.g., monthly or weekly, and stored on the vehicle, such as on the media server system 112 or distributed on storage associated with the user interface system 114, such as in seat electronic boxes 210 and/or user terminals, i.e., smart monitors. While this alternate embodiment disadvantageously lacks Internet connectivity during vehicle travel, it advantageously reduces system cost, as the satellite, antenna, and transceivers systems are not provided, and also reduces weight by the omission of such systems.

Figure 3:
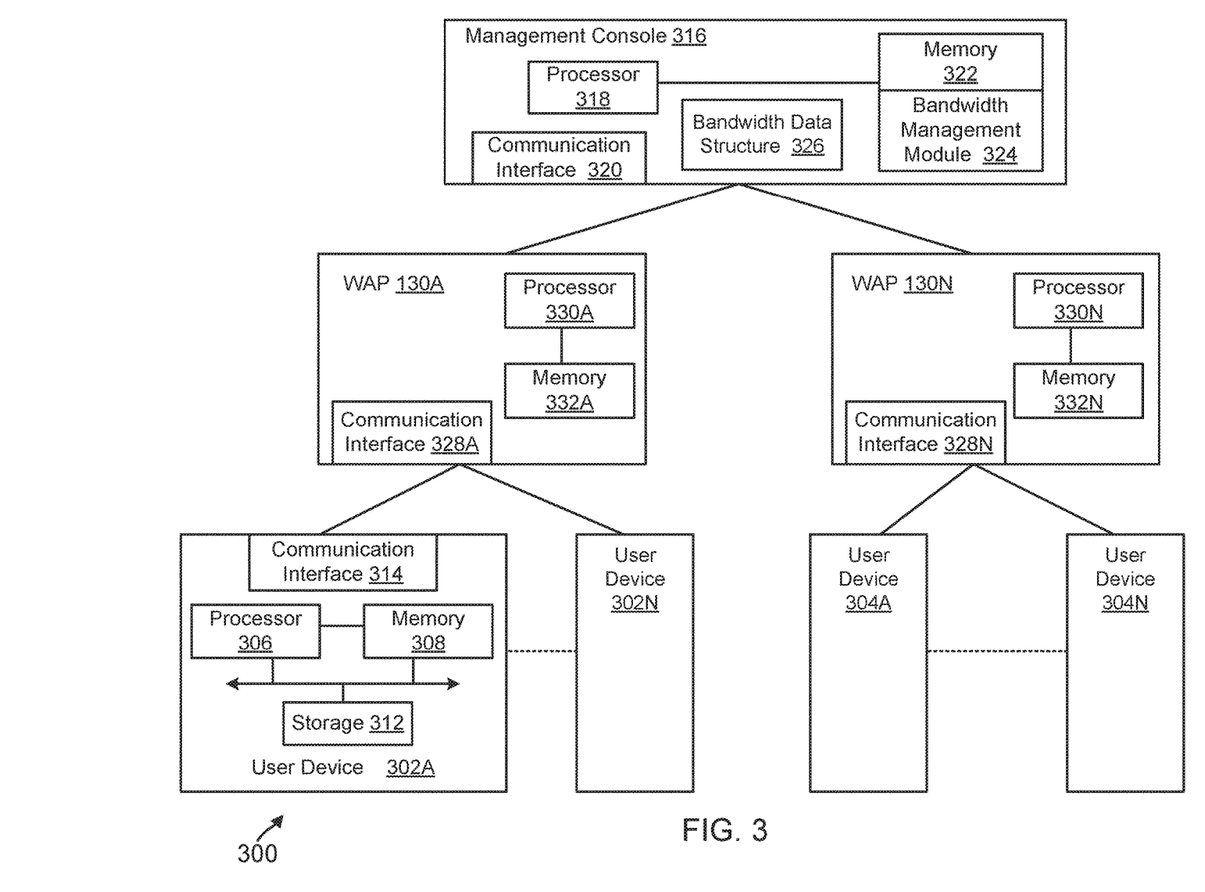
FIG. 3 shows an example of a system for managing bandwidth for user devices, according to one aspect of the present disclosure.

Bandwidth Management System:

FIG. 3 shows an example of a system 300 having a management console 316 for managing bandwidth at a transportation vehicle, according to one aspect of the present disclosure. From a high level system perspective, the system 300 preferably connects between the content distribution system 104 and the user interface system 114.

The system 300 shows a plurality of user devices 302A-302N that may be connected to a Wi-Fi network via a plurality of wireless access points' 130A-130N (may be referred to as WAP 130). A user device may be a mobile device, a tablet, a laptop, a notebook, a personal digital assistant, a smart watch or any other device type. Each user device may include a processor 306 having access to memory 308. A storage device 312 may be available via an interconnect 310. The user device 302A connects to a WAP via an interface card 314 (for example, a wireless card). Processor 306 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Each WAP includes a communication interface 328A-328N to communicate with a plurality of user devices. Each WAP may also include processor 330A-330N to execute firmware instructions out of memory 332A-332N for managing the overall operation of managing connections to the user devices. Processor 330A-330N may be, or may include, one or more programmable general-purpose or special-purpose microprocessors, digital signal processors (DSPs), programmable controllers, application specific integrated circuits (ASICs), programmable logic devices (PLDs), or the like, or a combination of such devices. Each WAP also provides connection information to a management console 316 that executes a bandwidth management module 324 from a memory 322. The bandwidth management module 324 maintains a bandwidth data structure 326 for managing bandwidth for user devices, as described below in detail. In alternate embodiments the data structure 326 may be implemented as a database, table, or technique for data storage.

The management console 316 includes a processor 318 that is used to execute the bandwidth management module 324 from the memory 322. Processor 318 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

It is noteworthy that bandwidth management module 324 may be executed locally at any computing device of the transportation vehicle or at a computing that can communicate with the transportation vehicle LRUs. The adaptive aspects of the present disclosure are not limited by the location of where the bandwidth management module 324 is executed. The process for managing device connections are now described with respect to FIGS. 4A-4B.

Figure 4A:
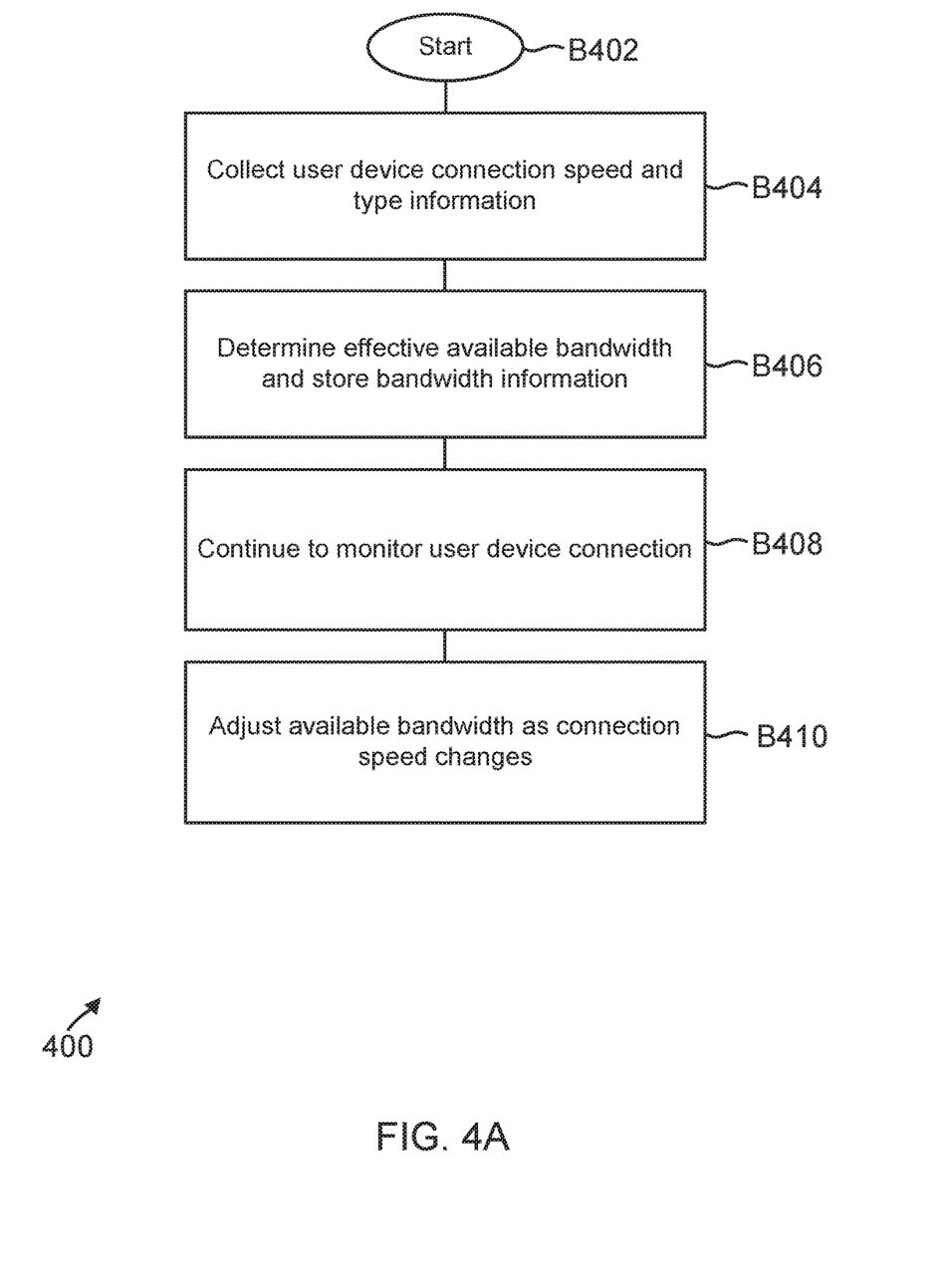
FIG. 4A shows a process for monitoring bandwidth, according to one aspect of the present disclosure.

Process Flow:

FIG. 4A shows a process 400 for collecting user device connection information, according to one aspect of the present disclosure. The process begins in block B402, when user devices are connected to a wireless network via one of the WAPs 130. One or more WAP 130, one or more user device and the management console 316 are initialized and operational.

In one aspect, different protocol/standards may be used for a user device connection. As mentioned above, one such standard for Wireless local area networks (WLANs) is defined by the various iterations of the IEEE 802.11 standard. IEEE 802.11 provides a set of media access control (MAC) and physical layer (PHY) specifications for implementing WLAN communication in the 900 MHz and 2.4, 3.6, 5, and 60 GHz frequency bands. Various revisions to the 801.11 standard have become separate commonly used standards, for example, 802.11a, 802.11g, 802.11n and 802.11ac. Other revisions of the 801.11 standard are also being pursued.

802.11n is an amendment that improves upon the previous 802.11 standards by adding multiple-input multiple-output (MIMO) antennas (MIMO). 802.11n operates on both the 2.4 GHz and the lesser-used 5 GHz bands. 802.11n operates at a maximum net data rate from 54 Mbps (megabits per second) to 600 Mbps.

IEEE 802.11ac is an amendment to IEEE 802.11 that builds on 802.11n. The standard include wider channels (80 or 160 MHz versus 40 MHz) in the 5 GHz band, more spatial streams (up to eight versus four), higher-order modulation (up to 256-QAM (quadrature amplitude modulation) vs. 64-QAM), and the addition of Multi-user MIMO (MU-MIMO). IEEE 801.11ac may be used for three spatial streams, and 256-QAM, yielding a data rate of up to 433.3 Mbps per spatial stream, 1300 Mbps total, in 80 MHz channels in the 5 GHz band.

These connection protocols have certain connection and bandwidth requirements. For example, for an 802.11n connection, the maximum available bandwidth maybe 72 Mbps. The effective bandwidth may be 90% of the maximum bandwidth, for example, 43 Mbps. An 802.11ac connection, may have a maximum available bandwidth of 86 Mbps and effective bandwidth may be 64% i.e., 55 Mbps. The bandwidth may also vary based on the number of antennas that are being used for the connection. It is noteworthy that the adaptive aspects described herein are not limited to any specific protocol. The following tables show the effective bandwidth for total bandwidth (shown as bandwidth)/effective bandwidth (ebandwidth) for different standards. The term MCS means modulation and coding scheme, Mod means Modulation type, Code means coding rate, and unit means the total bandwidth units. Bandwidth units are provided to permit faster calculation of bandwidth allocation.

802.11n, 400 ns guard interval (GI):

| | | | 20 MHz | | | 40 MHz | | |
|---|---|---|---|---|---|---|---|---|
| MCS | Mod | Code | Bandwidth | Ebandwidth | Unit | Bandwidth | Ebandwidth | Unit |
| 6 | 64-QAM | 3/4 | 65 | 39 | 256 | 135 | 67.5 | 149 |
| 7 | 64-QAM | 5/6 | 72.2 | 43.32 | 231 | 150 | 75 | 134 |
| 14 | 64-QAM | 3/4 | 130 | 78 | 129 | 270 | 135 | 74 |
| 15 | 64-QAM | 5/6 | 144.4 | 86.64 | 116 | 300 | 150 | 67 |
| 22 | 64-QAM | 3/4 | 195 | 117 | 86 | 405 | 202.5 | 50 |
| 23 | 64-QAM | 5/6 | 216.7 | 130 | 77 | 450 | 225 | 45 |

802.11ac, 400 ns GI:

Single Antenna PEDs (passenger device/user device):

|     |        |      | 20 MHz    |            |      | 40 MHz    |            |      |
| --- | ------ | ---- | --------- | ---------- | ---- | --------- | ---------- | ---- |
| MCS | Mod    | Code | Bandwidth | Ebandwidth | Unit | Bandwidth | Ebandwidth | Unit |
| 6   | 64-QAM | 3/4  | 65        | 42.25      | 237  | 135       | 74.25      | 135  |
| 7   | 64-QAM | 5/6  | 72.2      | 46.93      | 213  | 150       | 82.5       | 122  |
| 8   | 256-QAM| 3/4  | 86.7      | 56.35      | 178  | 180       | 99         | 101  |
| 9   | 256-QAM| 5/6  |           | N/A        |      | 200       | 110        | 91   |

802.11ac: 2×2 MIMO PEDs:

|     |        |      | 20 MHz    |            |      | 40 MHz    |            |      |
| --- | ------ | ---- | --------- | ---------- | ---- | --------- | ---------- | ---- |
| MCS | Mod    | Code | Bandwidth | Ebandwidth | Unit | Bandwidth | Ebandwidth | Unit |
| 6   | 64-QAM | 3/4  | 130       | 84.5       | 119  | 270       | 148.5      | 68   |
| 7   | 64-QAM | 5/6  | 144.4     | 93.86      | 107  | 300       | 165        | 61   |
| 8   | 256-QAM| 3/4  | 173.4     | 112.71     | 89   | 360       | 198        | 51   |
| 9   | 256-QAM| 5/6  |           | N/A        |      | 400       | 220        | 46   |

802.11ac—3×3 MIMO PEDs:

|     |        |      | 20 MHz    |            |      | 40 MHz    |            |      |
| --- | ------ | ---- | --------- | ---------- | ---- | --------- | ---------- | ---- |
| MCS | Mod    | Code | Bandwidth | Ebandwidth | Unit | Bandwidth | Ebandwidth | Unit |
| 6   | 64-QAM | 3/4  | 195       | 126.75     | 79   | 405       | 222.75     | 45   |
| 7   | 64-QAM | 5/6  | 216.6     | 140.79     | 71   | 450       | 247.5      | 41   |
| 8   | 256-QAM| 3/4  | 260.1     | 169        | 60   | 540       | 297        | 34   |
| 9   | 256-QAM| 5/6  |           | N/A        |      | 600       | 330        | 31   |

802.11g:

| Mod    | Bandwidth | Ebandwidth | Unit |
| ------ | --------- | ---------- | ---- |
| 64-QAM | 48        | 17.76      | 563  |
| 64-QAM | 54        | 19.98      | 501  |

In block B404, the bandwidth management module 324 collects user device connection speed and connection type information. The information may be obtained from the WAPs 130 and then stored at data structure 326. The information may be collected by the management console 316 by polling the WAPs 130 or the WAPs 130 may be configured to provide the connection information at regular time intervals. In another aspect, the WAPs 130 provide the connection information every time a device is connected. After the connection is established, WAP 130 may provide updates when the connection speed for the user device changes.

As an example, the management console 316 obtains the connection speed of each device, the number of antennas used and other information to determine the total and effective bandwidth that is available per WAP 130.

In block B408, the user devices are continued to be monitored. The available bandwidth at any given time is adjusted when user connection speed changes. For example, if a user device connection speed is reduced then the available bandwidth is reduced accordingly. In one aspect, the WAPs 130 monitor the user connection speed and provide the latest speed information to the bandwidth management module 324.

Figure 4B:
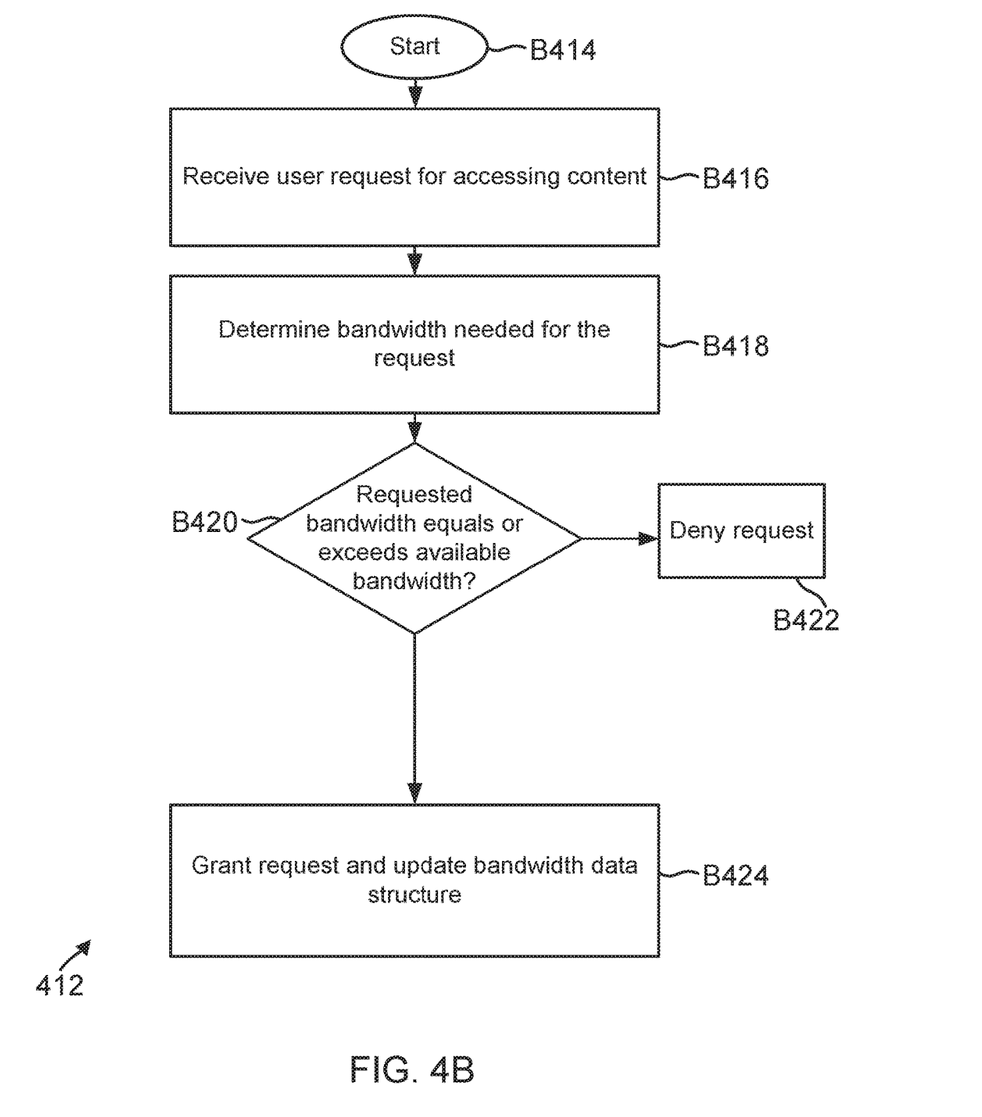
FIG. 4B show a process for handling user device requests for content, according to one aspect of the present disclosure.

FIG. 4B shows a process 412 for handling user requests for accessing content. The content may be for viewing content 124 from the content source 113 described above with respect to FIG. 1A. The content may be an audio file, a video file or any other content type. The bandwidth requirement for an audio or video file is different.

The process begins in block B414, when a user device is connected to a WLAN via a WAP. The connection speed and type information is already available at the management console 316. In block B416, the user requests certain content. The request type provides an indication of the bandwidth requirement. The bandwidth required for the request is determined in block B418.

In block B420, the bandwidth management module 324 determines if the additional bandwidth needed due to the request combined with a currently used bandwidth equals or exceeds the total effective bandwidth that is available at the given time. This is tracked using bandwidth data structure 326. If the additional bandwidth and the currently used bandwidth equals or exceeds the available bandwidth (i.e. the effective bandwidth), then the request is denied in block B422. This is different from conventional systems where the user experience or streaming is adjusted when bandwidth is not available.

The request is granted in block B424, if the additional bandwidth and the currently used bandwidth is below the available bandwidth.

The following provides an example for executing process 412. Assume that at any given time a user device requests a high definition video stream which may need about 1.5

Mbps in bandwidth for smooth playback. If the device is using an 802.11n connection, then the maximum bandwidth available is 72 Mbps. The effective bandwidth in practice is around 60%, i.e., around 43 Mbps. In one aspect, the system may rely on only 90% of the effective bandwidth being available, i.e., 0.90*43 Mbps=38.7 Mbps. If the requested additional 1.5 Mbps of bandwidth to fulfill the request does not exceed a total of 38.7 Mbps already currently in use to fulfill other requests via 802.11n, the connection is accepted. Otherwise the connection is refused. However, note that the 90% figure is not static, and in at least one embodiment, is adjusted based on reports from WAPs 130.

If the device requests a high definition video stream via 802.11ac, then the maximum bandwidth available is about 86 Mbps. The effective bandwidth in practice is about 64% of that amount, or around 55 Mbps (802.11ac has a greater effective bandwidth as a percentage of the maximum compared to 802.11n). The connection is accepted if the additional bandwidth required to fulfill the request, i.e., the additional 1.5 Mbps, does not exceed 90% of the maximum available bandwidth, i.e., 0.90*55 Mbps, or 49.5 Mbps. Otherwise the connection is refused (as described above the 90% figure is not necessarily a static value).

The process 412 may also be used for slow connection speed control. In one embodiment, the bandwidth management module 324 maintains at least two speed thresholds X and Y. A bandwidth quota Qx and Qy are assigned for the two thresholds. When connection speed is slower than X, and the remaining bandwidth quota is less than Qx, then the bandwidth request is rejected. When connection speed is slower than Y but faster than X, and the remaining bandwidth quota is less than Qy, then the bandwidth request is rejected. When connection speed is higher than Y, the request is accepted until Quota is exhausted or not enough. Qx and Qy can be adjusted based on the percentage of the Wi-Fi stations (WAPs 130) connecting at the speed lower than X or Y. In an alternative embodiment, the bandwidth management module 324 includes more than two speed thresholds for accommodation of MIMO devices and mixed connection environments.

The adaptive aspects disclosed herein have advantages. For example, an inflight system is able to efficiently manage bandwidth and content requests. A user is made aware of bandwidth restrictions when a request cannot be supported.

Figure 5:
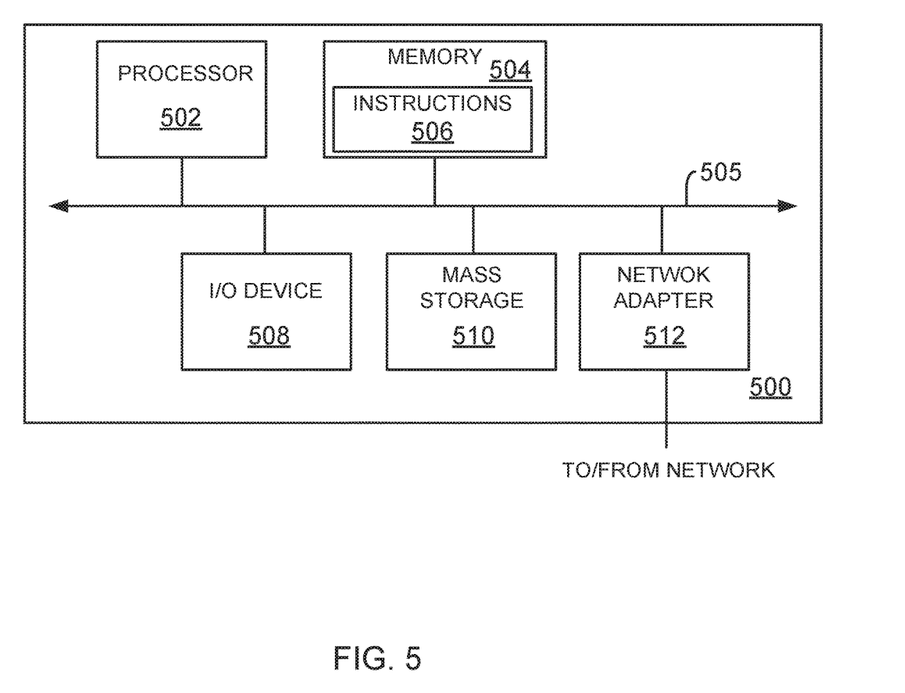
FIG. 5 shows an example of a hardware based, processing system, used according to one aspect of the present disclosure.

Processing System:

FIG. 5 is a high-level block diagram showing an example of the architecture of a processing system 500 that may be used according to one aspect. The processing system 500 can represent media server system 112, computing system 106, user interface system 114, WAP 130, management console 316 or any user device 302, 304 that attempts to interface with a vehicle computing device. Note that certain standard and well-known components which are not germane to the present aspects are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 may be used to implement the process steps of FIG. 4A described above as well as the logic used by the correlation engine 308. Memory 504 may also be used to store the correlation data structure 316, described above in detail.

Also connected to the processors 502 through the bus system 505 are one or more internal mass storage devices 510, and a network adapter 512. Internal mass storage devices 510 may be, or may include any conventional medium for storing large volumes of data in a non-volatile manner, such as one or more magnetic or optical based disks.

The network adapter 512 provides the processing system 500 with the ability to communicate with remote devices (e.g., over a network and may be, for example, an Ethernet adapter, a Fibre Channel adapter, or the like.

The processing system 500 also includes one or more input/output (I/O) devices 508 coupled to the bus system 505. The I/O devices 508 may include, for example, a display device, a keyboard, a mouse, etc.

Thus, a method and apparatus for bandwidth on a vehicle have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising:

receiving by a processor, a request from a user device from among a plurality of user devices to access content via a wireless network of a transportation vehicle, the user request providing an indication of additional bandwidth based on content type; wherein the plurality of user devices use one or more connection protocols to connect to the wireless network, each connection protocol defining a maximum bandwidth and an effective bandwidth as a pre-requisite for accessing the wireless network, the effective bandwidth being less than the maximum bandwidth;

determining by the processor from a data structure, an effective bandwidth for the plurality of user devices depending on a connection type defined by the one or more connection protocols; wherein the data structure identifies a connection type for each of the plurality of user devices and a connection speed for each of the plurality of user devices; and rejecting by the processor, the request for accessing the content, based on either when the additional bandwidth for the user request and a currently used bandwidth equals or exceeds the effective bandwidth for the plurality of user devices to access the wireless network, and when a connection speed of the user device is lower than a first connection speed threshold and the effective bandwidth is less than a first bandwidth quota maintained by the processor for bandwidth management;

wherein the processor maintains a second connection speed threshold and a second bandwidth quota for bandwidth management; and when the connection speed is higher than the second connection speed threshold, the request is accepted unless the second bandwidth quota has been exhausted.

2. The method of claim 1, wherein the transportation vehicle is an aircraft and the content is made available via an in-flight entertainment system.

3. The method of claim 1, wherein the request is to access one or both of an audio file and a video file.

4. The method of claim 1, wherein the first bandwidth quota and the second bandwidth quota are adjustable based on a percentage of user devices connecting at speeds lower than the first threshold or the second threshold.

5. The method of claim 1, wherein the transportation vehicle is one of an aircraft, automobile, a bus, a train and a recreational vehicle (RV).

6. A non-transitory, machine readable medium having stored thereon instructions comprising machine executable code which when executed by a machine, causes the machine to:

receive by a processor, a request from a user device from among a plurality of user devices to access content via a wireless network of a transportation vehicle, the user request providing an indication of additional bandwidth based on content type; wherein the plurality of user devices use one or more connection protocols to connect to the wireless network, each connection protocol defining a maximum bandwidth and an effective bandwidth as a pre-requisite for accessing the wireless network, the effective bandwidth being less than the maximum bandwidth;

determine by the processor from a data structure, an effective bandwidth for the plurality of user devices depending on a connection type defined by the one or more connection protocols; wherein the data structure identifies a connection type for each of the plurality of user devices and a connection speed for each of the plurality of user devices; and reject by the processor, the request for accessing the content, based on either when the additional bandwidth for the user request and a currently used bandwidth equals or exceeds the effective bandwidth for the plurality of user devices to access the wireless network, and when a connection speed of the user device is lower than a first connection speed threshold and the effective bandwidth is less than a first bandwidth quota maintained by the processor for bandwidth management;

wherein the processor maintains a second connection speed threshold and a second bandwidth quota for bandwidth management; and when the connection speed is higher than the second connection speed threshold, the request is accepted unless the second bandwidth quota has been exhausted.

7. The non-transitory, machine readable medium of claim 6, wherein the transportation vehicle is an aircraft and the content is made available via an in-flight entertainment system.

8. The non-transitory, machine readable medium of claim 6, wherein the request is to access one or both of an audio file and a video file.

9. The non-transitory, machine readable medium of claim 6, wherein the first bandwidth quota and the second bandwidth quota are adjustable based on a percentage of user devices connecting at speeds lower than the first threshold or the second threshold.

10. The non-transitory, machine readable medium of claim 6, wherein the transportation vehicle is one of an automobile, a bus, a train and a recreational vehicle (RV).

11. A system, comprising:

a memory containing non-transitory, machine readable medium comprising machine executable code having stored thereon instructions; and a processor module coupled to the memory, the processor module configured to execute the machine executable code to:

receive a request from a user device from among a plurality of user devices to access content via a wireless network of a transportation vehicle, the user request providing an indication of additional bandwidth based on content type; wherein the plurality of user devices use one or more connection protocols to connect to the wireless network, each connection protocol defining a maximum bandwidth and an effective bandwidth as a pre-requisite for accessing the wireless network, the effective bandwidth being less than the maximum bandwidth;

determine from a data structure, an effective bandwidth for the plurality of user devices depending on a connection type defined by the one or more connection protocols; wherein the data structure identifies a connection type for each of the plurality of user devices and a connection speed for each of the plurality of user devices; and reject the request for accessing the content, based on either when the additional bandwidth for the user request and a currently used bandwidth equals or exceeds the effective bandwidth for the plurality of user devices to access the wireless network, and when a connection speed of the user device is lower than a first connection speed threshold and the effective bandwidth is less than a first bandwidth quota maintained by the processor for bandwidth management;

wherein the processor maintains a second connection speed threshold and a second bandwidth quota for bandwidth management; and when the connection speed is higher than the second connection speed threshold, the request is accepted unless the second bandwidth quota has been exhausted.

12. The system of claim 11, wherein the transportation vehicle is an aircraft and the content is made available via an in-flight entertainment system.

13. The system of claim 11, wherein the request is to access one or both of an audio file and a video file.

14. The system of claim 11, wherein the first bandwidth quota and the second bandwidth quota are adjustable based on a percentage of user devices connecting at speeds lower than the first threshold or the second threshold.

* * * * *